United States Patent [19]

Daumal Castellon

[11] Patent Number: 5,674,024
[45] Date of Patent: Oct. 7, 1997

[54] HIGH SPEED FASTENING SYSTEM

[76] Inventor: Melchor Daumal Castellon, Diputación, 455, Barcelona, Spain, 08013

[21] Appl. No.: 512,756

[22] Filed: Aug. 9, 1995

[30] Foreign Application Priority Data

Aug. 11, 1994 [ES] Spain .................................. 94/01810

[51] Int. Cl.⁶ ............................................................ F16D 1/10
[52] U.S. Cl. ........................... 403/321; 403/315; 403/325; 403/328; 403/359; 464/182; 464/901
[58] Field of Search .................................. 403/315, 321, 403/322, 324, 325, 327, 328, 359, DIG. 6; 464/182, 901

[56] References Cited

U.S. PATENT DOCUMENTS

| Re. 34,381 | 9/1993 | Barnes | 403/322 X |
|---|---|---|---|
| 2,910,842 | 11/1959 | Sensenig | 464/182 |
| 3,180,435 | 4/1965 | McHenry | 464/901 X |
| 3,186,745 | 6/1965 | Lyles | 403/322 X |
| 3,884,049 | 5/1975 | Pauli | 464/182 X |
| 4,289,414 | 9/1981 | Recker | 464/901 X |
| 4,402,626 | 9/1983 | Recker | 403/328 |
| 4,431,334 | 2/1984 | Cleveland et al. | 403/328 X |
| 4,523,871 | 6/1985 | Recker | 403/322 X |
| 4,582,347 | 4/1986 | Wilcox et al. | 403/325 X |
| 4,906,123 | 3/1990 | Weskamp et al. | 403/322 |
| 4,927,286 | 5/1990 | Hobluigie et al. | 403/322 |

FOREIGN PATENT DOCUMENTS

| 1108528 | 6/1961 | Germany | 403/325 |
|---|---|---|---|
| 1119067 | 12/1961 | Germany | 403/325 |
| 175064 | 4/1961 | Sweden | 403/325 |

*Primary Examiner*—Blair Johnson
*Assistant Examiner*—Andrea Chop
*Attorney, Agent, or Firm*—Jacobson, Price, Holman & Stern, PLLC

[57] ABSTRACT

A high-speed fastening system includes a conventional yoke coupled to a likewise conventional shaft provided with specific fastening elements, via a vertically movable outer casing and a central body into which the shaft is inserted so as to secure the yoke to the aforementioned shaft. The auxiliary components, in addition to those already mentioned, include a catch fitted in the arch of the yoke, an intermediate sleeve inserted into the inner part of the central body, an inner spring situated inside the sleeve, and an outer spring whose ends rest in the arched part of the yoke and in the lower part of the outer casing. The shaft is fitted or dismantled from the interior of the yoke body by conventional ball bearings in combination with an annular zone situated in the insertion zone of the aforementioned shaft. The system, by slight pressure of the shaft downwards towards the yoke body, enables the bearings to be interlocked by insertion with the insertion zone, whereas the shaft can be freed from the insertion zone by an opposite movement, by the downward pressure of the outer casing.

3 Claims, 2 Drawing Sheets

HIGH SPEED FASTENING SYSTEM

FIELD OF THE INVENTION

The invention relates to the sector which uses mechanical technology to design components for high-speed fasteners in the car sector and similar sectors where it is necessary to transmit motion from a rotary shaft to a yoke provided with housings for its bearing components and a universal joint for conveying the motion of the shaft to another shaft mounted at the end of another yoke and coupled to the first yoke by the corresponding universal joint.

BACKGROUND OF THE INVENTION

In the aforementioned sector of mechanical technology, it is important to assemble and fasten the various components quickly, and also to prevent this high speed resulting in faulty assembly and subsequent technical problems.

The proposed high-speed fastening system combines the features required in this kind of technology and previously stated, i.e. reliability and high speed, not only in assembly of the fastening elements but also when they need to be dismantled, a process which is carried out with equal speed.

SUMMARY OF THE INVENTION

The high-speed fastening system comprises a conventional yoke coupled to a likewise conventional shaft provided with specific fastening elements, via a vertically movable outer casing and a central body into which the shaft is inserted so as to secure the yoke to the aforementioned shaft.

The auxiliary components, in addition to those already mentioned, comprise a catch fitted in the arch of the yoke, an intermediate sleeve inserted into the inner part of the central body, an inner spring situated inside the sleeve, and an outer spring whose ends rest in the arched part of the yoke and in the lower part of the outer casing.

The shaft is fitted or dismantled from the interior of the yoke body by means of conventional ball bearings in combination with an annular zone situated in the insertion zone of the aforementioned shaft.

The system, by slight pressure of the shaft downwards towards the yoke body, enables the bearings to be interlocked by insertion with the insertion zone, whereas the shaft can be freed from the insertion zone by an opposite movement, by means of the downward pressure of the outer casing.

Other details and features of the present patent application will be clear from reading the following description, with reference to the drawings accompanying this description and in which the preferred details are schematically represented. The details are given byway of example, with reference to a possible embodiment, but the description is not limited to the details set out, and should therefore be regarded by way of illustration and without limitation of any kind.

DETAILED DESCRIPTION OF THE PREFERRED EMBODIMENTS

Figure 1:
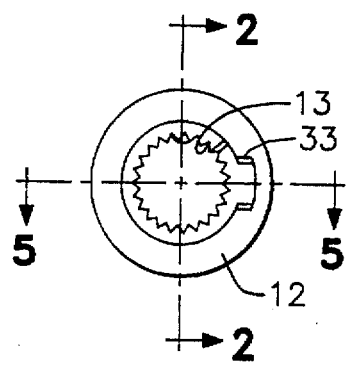
FIG. 1 is a top plan view of the outer casing 12 which surrounds the central body 11 and has a toothed internal surface 13 and is formed in one diametral plane with a groove 33 which, in co-operation with a slope 31, is used for insertion and alignment of the rapid fastening components, without possibility of a mistake.

The various components numbered in the drawings accompanying the present description are as follows: central body 11, outer casing 12, toothed inner surface 13, catch 14, intermediate sleeve 15, bolt 16, inner spring 17, intermediate spring 18, bearings 19, yoke 20, outer spring 21, arms 22, bearing housing 23, arch 24, rib 25, toothed outer surface 26, shaft 27, insertion zone 28, grooved zone 29, inclined planes 30, slope 31, inner surface of 12, 32; groove 33, bore 34 and support zone 35.

In a preferred embodiment of the present application, as shown in FIGS. 2, 3, 4 and 5, the high-speed connection system comprises a yoke 20 having arms 22 with housings 23 for ball bearings and an arch 24 reinforced by ribs 25 in the upper part of the yoke. The bottom end of the central body 11 is disposed in the arch 24 and the central part of the yoke 20 and is preferably cylindrical, with the lower ends facing outwards, the body 11 containing the catch component 14 which is substantially cylindrical and a central part of which has a substantially cylindrical bore along which the inner spring 17 can move.

The outer casing 12, which surrounds the central body 11 fitted in the yoke 20, has a completely cylindrical surface and its inner surface 32 serves as a slide for the ball bearings 19.

The inner surface of the central body 11 has a toothed interior 13 for inserting the shaft 27. The shaft 27 has a substantially cylindrical shape and its inner end terminates in a likewise toothed insertion zone 28 connected to the surface 13 of the central body 11.

To prevent mistakes and ensure that the system can be high-speed, the inner surface of the outer casing 12 is formed with a groove 33 which, in co-operation with the slope 31, is used for inserting the shaft via the inclined plane 30 into a uniquely defined position.

The intermediate component or sleeve 15 is disposed inside the central body 11 and contains the intermediate spring 18 which presses to the rear against the catch component 14 of sleeve 15, maintaining a constant pressure on the sleeve. Passing through the intermediate component or sleeve 15 is bolt 16 having a shaft 36. Inner spring 17 extends about shaft 36 between catch component 14 and a head of the bolt 16. Shaft 36 is slidable through an opening of catch component 14.

One end of the outer spring 21 is disposed above the upper part of the yoke 20 and above its arched zone 24, the opposite end bearing on the lower part of the outer casing 12 and on the support zone 35, where the outer casing 12 has a recess reducing its diameter so that the said part can be surrounded by the aforementioned end of the spring 21.

Figure 2:
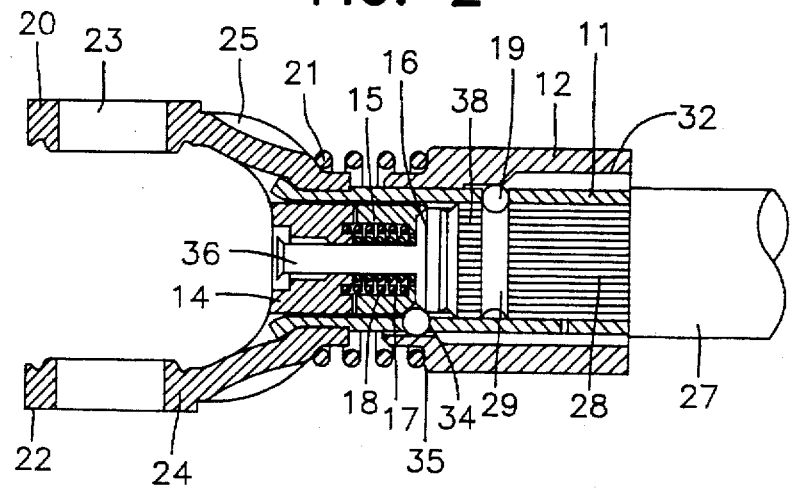
FIG. 2 is a section through A—A of FIG. 1, in which the high-speed fastening system is in the assembly position in which the upper ball bearing 19 is inserted into the grooved zone 29 and the lower ball bearing is inserted into the bore provided in the central zone of the central body 11.
Figure 3:
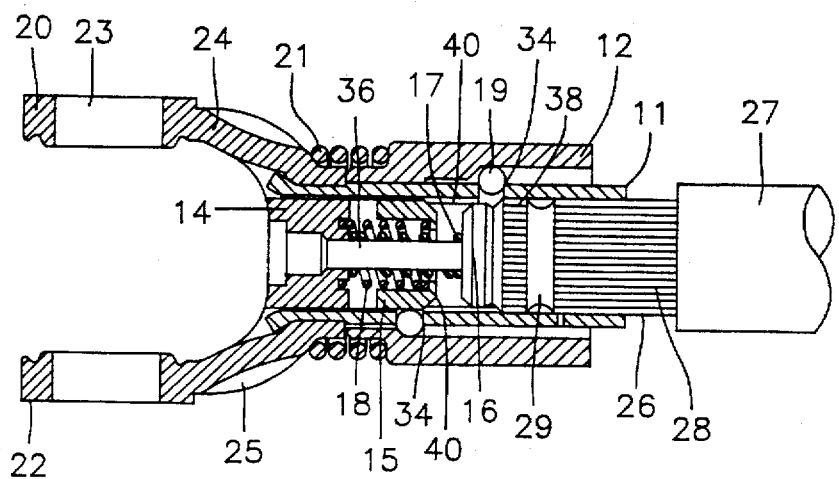
FIG. 3 is a section through A—A of FIG. 1 in which the high-speed fastening system is dismantled. As can be seen, the central body 11 is partly outside the outer casing 12 and the ball bearings 19 are situated outside the annular zone 29.

As shown in FIGS. 2 and 3, which correspond to the cross-sections through AA in FIG. 1, the system being shown dismantled in FIG. 3 and assembled in FIG. 2, in order to change from one form to the other, i.e. from assembly to the dismantled state, it is only necessary to apply force to the outer casing 12 as to compress the springs 21, 17 and 18 in order to eject the ball bearings 19 from the bores 34 in the surface of the central body 11, so that both bearings 19 are ejected from the grooved surface or zone 29 in the bottom part of 28, and likewise the bottom bearing 19 is ejected from the top part of the intermediate sleeve 15 with the result that owing to the force of the spring 21, the shaft 27 is withdrawn from the interior of the outer casing 12, the central body 11 being exposed to the exterior.

Figure 4:
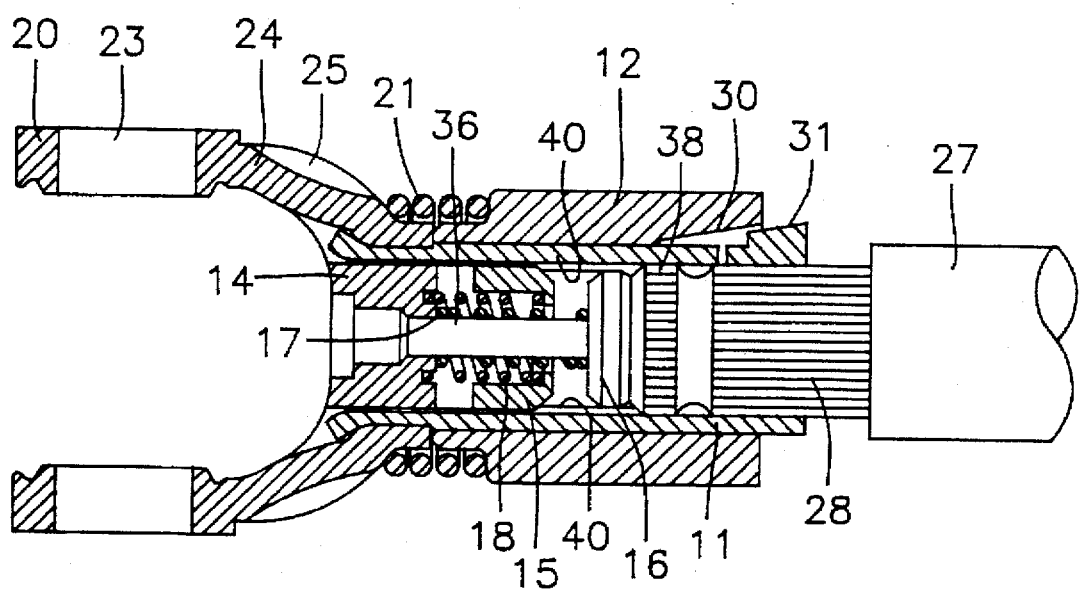
FIG. 4 is a section through B—B of FIG. 1, showing the high-speed connecting system when completely dismantled.
Figure 5:
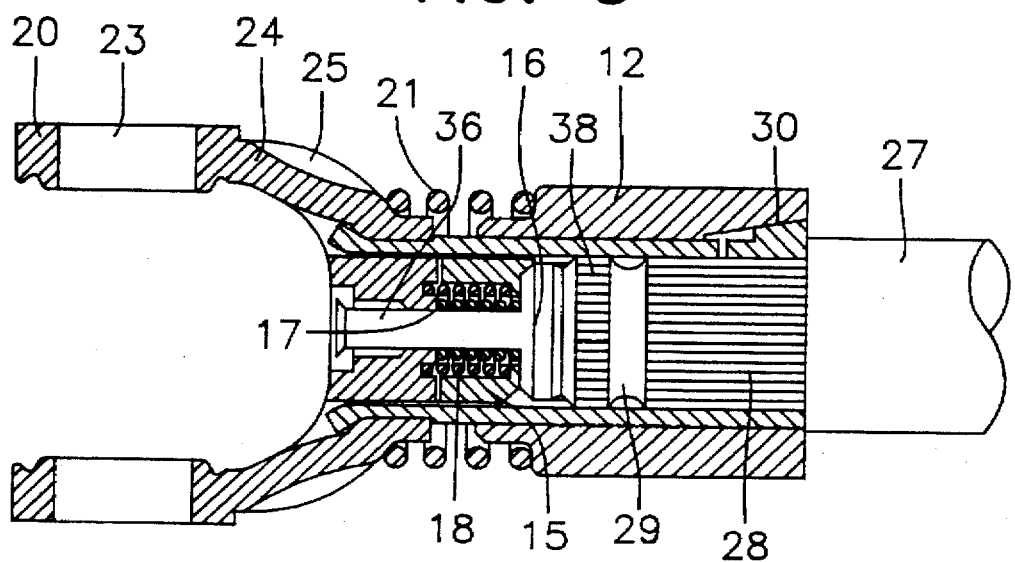
FIG. 5 is a section through B—B of FIG. 1, when the system is completely assembled.

As shown in assembled form in FIG. 2, the ball bearings 19 are inserted into the grooved zone 29 and into the upper part of the intermediate sleeve 15, and are held in this position by the force of the spring 21, the ends of which are in the arch 24 of the yoke 20 and in the supporting zone 35 of the outer casing 12. The force of spring 21 overcomes the bias of springs 17 and 18 pushing against the sleeve 15 and the bolt 16. As shown in FIGS. 2 and 3, the operator exerts slight pressure downwards on the outer casing 12, thus dismantling and unlocking the high-speed connecting system. This allows expansion of springs 17 and 18 to force the bolt 16 to push against the shaft 27. As shown in FIGS. 4 and 5, the aforementioned speed is accompanied by the impossibility of mistakes, i.e. assembling the shaft 27 in an incorrect manner, owing to the engagement of a leading end 38 of shaft 27 with internal teeth 40 of central body 11. In addition, the slope 31 of central body 11, which can slide only along the inclined plane 30 situated in the groove 33 provides for the inserting of the shaft 27 in only one position, since that said slope 31 must fit in the said plane 30 of the groove 33 of the outer casing 12. There is thus no possibility of the shaft 27 being placed in the wrong position. All this is assisted by the toothed inner surface 13 of the central body 11 and the toothed surface of the zone 28 for inserting the shaft 27. The system is then assembled by aligning the slope 31 in the interior of the groove 33 and by strong pressure on the shaft 27 downwards in the descending direction, whereas the device can be dismantled simply by pressing the outer casing 12 downwards against the force and resistance of the outer spring 21 and the intermediate spring 18.

As is clear from the drawings and the explanation thereof, the present description provides a simple, effective construction which can be embodied with great ease and undoubtedly constitutes a novel industrial result.

The invention has been adequately described in conjunction with the accompanying drawings. Of course various modifications of detail can be introduced as required, without the aforementioned modifications altering the substance of the invention.

I claim:

1. A high speed fastening system comprising
   a shaft,
   a yoke having arms each provided with a bearing housing for corresponding bearings and having an arch reinforced by ribs,
   said shaft being coupled to said yoke by a cylindrical outer casing containing a central body having a lower part extending into said arch of said yoke, said central body and said cylindrical outer casing containing corresponding parts for fastening, pressure and alignment of said central body and said cylindrical outer casing, said parts including an exterior surface of said central body cooperating with a groove in said cylindrical outer casing so that said central body can fit into said cylindrical outer casing only in a single orientation between said central body and said cylindrical outer casing.

2. The high speed fastening system claimed in claim 1, wherein the coupling between said shaft and said yoke is performed by bores in a cylindrical surface of said central body which contain ball bearings, an upper one of said ball bearings being inserted in a grooved zone, whereas a second one of said ball bearings is in an upper part of an intermediate sleeve in combination with a catch fitted in an inner part of the lower part of said central body and said intermediate sleeve being subjected to pressure by a intermediate spring, an inner spring being disposed inside said intermediate spring and in said catch.

3. The high speed fastening system as claimed in claim 2, wherein a pressure device located between said cylindrical outer casing and an arched zone of said yoke includes an outer spring, one end of which bears on an upper part of said yoke whereas an opposite end bears on a supporting zone at s bottom part of said cylindrical outer casing.

* * * * *